US007861239B2

(12) United States Patent
Mayfield et al.

(10) Patent No.: US 7,861,239 B2
(45) Date of Patent: Dec. 28, 2010

(54) DATA MIGRATION BETWEEN VERSIONS OF SOFTWARE

(75) Inventors: Kevin B. Mayfield, Lenexa, KS (US); Srinivasa Bhagavan, Overland Park, KS (US); Nelson R. Corcoran, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 1618 days.

(21) Appl. No.: 11/135,097

(22) Filed: May 23, 2005

(65) Prior Publication Data

US 2006/0265696 A1 Nov. 23, 2006

(51) Int. Cl.
G06F 9/44 (2006.01)
G06F 9/445 (2006.01)
(52) U.S. Cl. .................. 717/170; 717/168; 717/169
(58) Field of Classification Search ................ None
See application file for complete search history.

(56) References Cited

U.S. PATENT DOCUMENTS

| | | | | |
|---|---|---|---|---|
| 4,558,413 | A * | 12/1985 | Schmidt et al. | 707/203 |
| 6,086,622 | A * | 7/2000 | Abe et al. | 703/26 |
| 6,117,187 | A * | 9/2000 | Staelin | 717/169 |
| 6,173,335 | B1 * | 1/2001 | Culbert et al. | 719/310 |
| 6,233,589 | B1 * | 5/2001 | Balcha et al. | 707/203 |
| 6,334,215 | B1 | 12/2001 | Barker et al. | 717/11 |
| 6,353,896 | B1 | 3/2002 | Holzmann et al. | 714/38 |
| 6,356,285 | B1 | 3/2002 | Burkwald et al. | 345/853 |
| 6,370,646 | B1 | 4/2002 | Goodman et al. | 713/100 |
| 6,385,606 | B2 | 5/2002 | Inohara et al. | 707/4 |
| 6,484,276 | B1 * | 11/2002 | Singh et al. | 714/41 |
| 6,493,768 | B1 | 12/2002 | Boutcher | 709/330 |
| 6,745,176 | B2 | 6/2004 | Probert, Jr. et al. | 707/2 |
| 7,496,912 | B2 * | 2/2009 | Keller et al. | 717/174 |
| 2002/0100036 | A1 * | 7/2002 | Moshir et al. | 717/173 |
| 2003/0145315 | A1 | 7/2003 | Aro et al. | 717/170 |

(Continued)

FOREIGN PATENT DOCUMENTS

EP 1 267 263 A2 5/2002

OTHER PUBLICATIONS

Kirk Rafferty, Using the Red Hat Package Manager, Jan. 2000, Linux journal, Issue 69es, Article #6.*

*Primary Examiner*—Lewis A Bullock, Jr.
*Assistant Examiner*—Chris Nelson
(74) *Attorney, Agent, or Firm*—Patrick J. Daugherty; Driggs, Hogg, Daugherty & Del Zoppo Co., LPA

(57) ABSTRACT

A system and method are used for updating software to include new versions of the software without losing the ability to return to the prior software in the event of flaws or deficiencies in the new version. A framework organizes conversion and reversion codes into major components responsible for conversion of the data entities. The components are ordered based on their dependence on other components first completing their conversions. Each component implements an interface allowing a framework to process sequentially through all components and sequentially retrieve handles for their respective entities, and accessing the version of the entity. The framework processes an ordered set of interfaces representing the conversion/reversion, checks for progressively newer versions. As data structures are changed for a single component, a new version is appended to that component's ordered set of version interfaces. Restart of a conversion or reversion following an interrupt is also provided.

24 Claims, 2 Drawing Sheets

U.S. PATENT DOCUMENTS

| | | | |
|---|---|---|---|
| 2003/0182414 A1* | 9/2003 | O'Neill | 709/223 |
| 2003/0202012 A1 | 10/2003 | Kemp | 345/762 |
| 2004/0148381 A1 | 7/2004 | Beppu et al. | 709/223 |
| 2004/0205458 A1 | 10/2004 | Hwang et al. | 715/500 |
| 2005/0050538 A1* | 3/2005 | Kawamata et al. | 717/168 |
| 2005/0114853 A1* | 5/2005 | Glider et al. | 717/170 |

* cited by examiner

DATA MIGRATION BETWEEN VERSIONS OF SOFTWARE

FIELD OF THE INVENTION

The present invention relates to the conversion and reversion of various categories of logical entities created by an earlier release of software to a subsequently released version, and to the reversion to the earlier release.

BACKGROUND OF THE INVENTION

New versions of software are constantly being created, and sometimes users wait through multiple versions before upgrading or converting to a more current iteration of the software. The user may also demand the ability to return or revert to the old version of the software if they discover a problem after use for a period of time. This multiple version conversion and reversion process becomes more complicated with each new release. Much of the updating may need to be done manually, often involving time consuming procedures. Newer software packages are able to make the upgrades without requiring manual steps. Nevertheless, because of this complexity, the recovery from system failures during the reversion process is limited to restoring the data files from archive, and starting over with the conversion.

In the case of a server, such as the IBM Informix Dynamic Server (IDS), (described in more detail at www-306.ibm.com/software/data/informix/ids., the entire contents of which is incorporated herein), multiple databases are hosted by the server, each database having its own system catalog. The implementation of a conversion typically requires development to keep growing a small set of files with new functions, and modifying a common set of utility functions with new code that is conditionally executed. The version information is finally updated when the final version is reached. Because of the large number of changes that are required during conversion, long transactions must be prevented by breaking them up into multiple transactions. This, in turn, leads to thousands of states that were not clearly identifiable. In the event of a system failure, recovery and restart are rendered difficult, if not impossible. Failure requires reload from backup (if available), and starting over.

SUMMARY OF THE INVENTION

To facilitate the understanding of the present invention, the following terms have the definitions as follows unless clearly contraindicated within the body of the specification.

| | |
|---|---|
| Component Entity | A unit or chunk of a decomposed component that can be manipulated atomically |
| Component Manager | Manages all the entities of a component and interacts with the framework |
| CRF | Conversion/Reversion Framework |
| Facade | A design pattern that defines a higher-level business component that contains and centralizes complex interactions between lower-level business components. |
| Proxy | A design pattern that defines a surrogate or placeholder for another object to control access to it |
| State Machine | A design pattern implemented as a non-deterministic finite automaton that defines a finite set of states and its events and transitions |
| XML | Meta-descriptor language used to describe the metadata for the C/R framework. |

The present invention covers conversion of various categories of logical entities created by an earlier release of software, to the latest version. It also covers the reversion of various categories of logical entities, from the latest version to a specified earlier version.

The invention allows restartability, and simplifies the implementation of upgrade code to support multiple starting points.

The invention also allows for conversion code from the previous release to remain unmodified and, therefore, less likely to be broken when adding additional conversion/reversion code.

The present invention is a framework that generalizes the conversion and reversion processes. It organizes the conversion and reversion code into major components responsible for conversion of the data entities. Further, these components are ordered based on their dependence on another major component having completed its conversion work, where the independent component comes first.

Each component implements an interface, allowing a framework process through all components sequentially, and sequentially retrieve handles for their respective entities, and accessing the version of the entity. It also allows the framework to process an ordered set of interfaces representing the conversion, reversion, and pre-reversion checks for progressively newer versions. As data structures are changed for a single component, a new version is appended to that component's ordered set of version interfaces.

The invention relates to a system and a method for converting various categories of logical data entities of a previous software release to an update of the logical entities and for the reversion of the logical entities to the previous release. This includes the following steps.

A conversion code and a reversion code are provided for each logical data entity. The conversion and reversion codes are organized into major components responsible for conversion of the logical data entities. These components are then arranged into a priority of dependencies. Then, the conversion of independent components is completed before proceeding with the conversion of dependent components. The method and system have the ability to stop the updating at multiple locations of the conversion procedure, and for restarting the update at the location where the update has stopped. By preserving the conversion code from a previous software release, it remains possible to revert to the previous release in the event there is trouble with the conversion.

The major components are ordered according to their dependency on completion of a conversion task by other major components, with the conversion of independent components occurring before the conversion of components dependent on the independent components. The invention has the ability to convert or revert from one size platform to a platform having a smaller or larger size by first moving to the target platform within the same server version or the first successor server version having compatible conversion semantics, and then proceeding to the target version. For example, a conversion may be between a 32 bit platform and a 64 bit platform.

The invention also relates to a system and a process for the conversion of categories of logical data entities from a previous software release to an updated release, for the reversion of logical entities to the previous release, and for the restart of a conversion or reversion that has been interrupted. The conversion/reversion/restart utilizes a component manager to manage multiple data entities and to conduct the conversion and reversion for said data entities. A state machine is instantiated by a framework façade to start the conversion for the component manager and instructs the component manager to iterate through all data entities that it manages. The components are arranged into a priority of dependencies. The conversion or reversion of independent components proceeds before the conversion or reversion of dependent components, and the conversion of major dependent components is completed before the conversion of minor dependent components.

The conversion state machine instructs the component manager to perform legacy checks of previous software releases for each entity. The component manager has several capabilities including performing parallel conversions for the simultaneous handling of multiple entities; determining if each entity requires conversion; and iterating through its set of versions of the software release before and after conversion. Another state machine is used for the reversion to a legacy or previous software version, and a third state machine is used for the restart of an interrupted conversion or reversion.

BRIEF DESCRIPTION OF THE DRAWINGS

The drawings are presented to facilitate the understanding of the present invention without intending to limit the scope thereof. These drawings are briefly described as follows.

DESCRIPTION OF THE PREFERRED EMBODIMENTS

Figure 1:
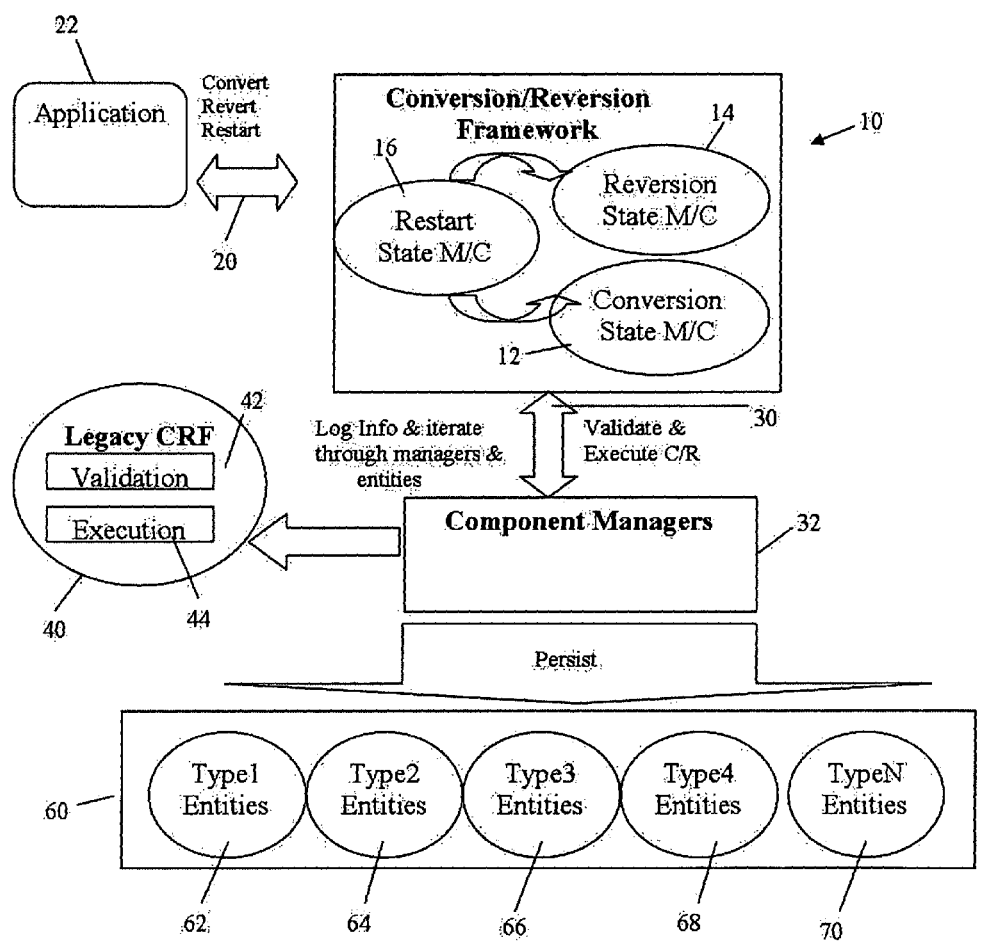
FIG. 1 is a system high level design diagram.

The high level design shown in FIG. 1 is a component view of the conversion/reversion framework along with relationships between the components, their entities, and persistent storage representation.

Within the conversion/reversion framework 10 are shown the conversion state machine 12, the reversion state machine 14 and the restart state machine 16. A bilateral link 20 is established between the CRF 10 and a new data application 22. Likewise, a two way link 30 is established between the CRF 10 and the component managers 32 so that each of the state machines is capable of interacting with the managers. This link serves to log information and iterate the same through the managers and the entities, and also to validate and execute the conversion or reversion. Each of the component managers is responsible for managing specific component versions, thereby ensuring server integrity during the conversion or reversion. This responsibility includes interaction with the legacy CRF, transactions, and logging data. The legacy CRF 40 is shown with two functions—validation 42 and execution 44. The validation detects and then provides a complete listing of all of the compatibilities to address before executing the conversion or reversion. When this is done, the legacy CRF proceeds with execution. The entities under the control of the component managers 32 are represented in the entity store 60 by five entities identified as Type 1 entities 62, Type 2 entities 64, Type 3 entities 66, Type 4 entities 68, and Type N entities 70. These entities are persisting and are overlapping, showing their interdependencies. During a conversion or reversion, each individual entity type will be in a different phase of the change, depending on their interdependencies. Thus, the Type 3 entities 66 are shown as overlapping those entity types on either side. This means that this more independent type of entity must complete a specific aspect of the conversion before the more dependent entity types commence theirs. During reversion, the reverse is true with the more dependent entities completing reversion prior to the less dependent entities.

Figure 2:
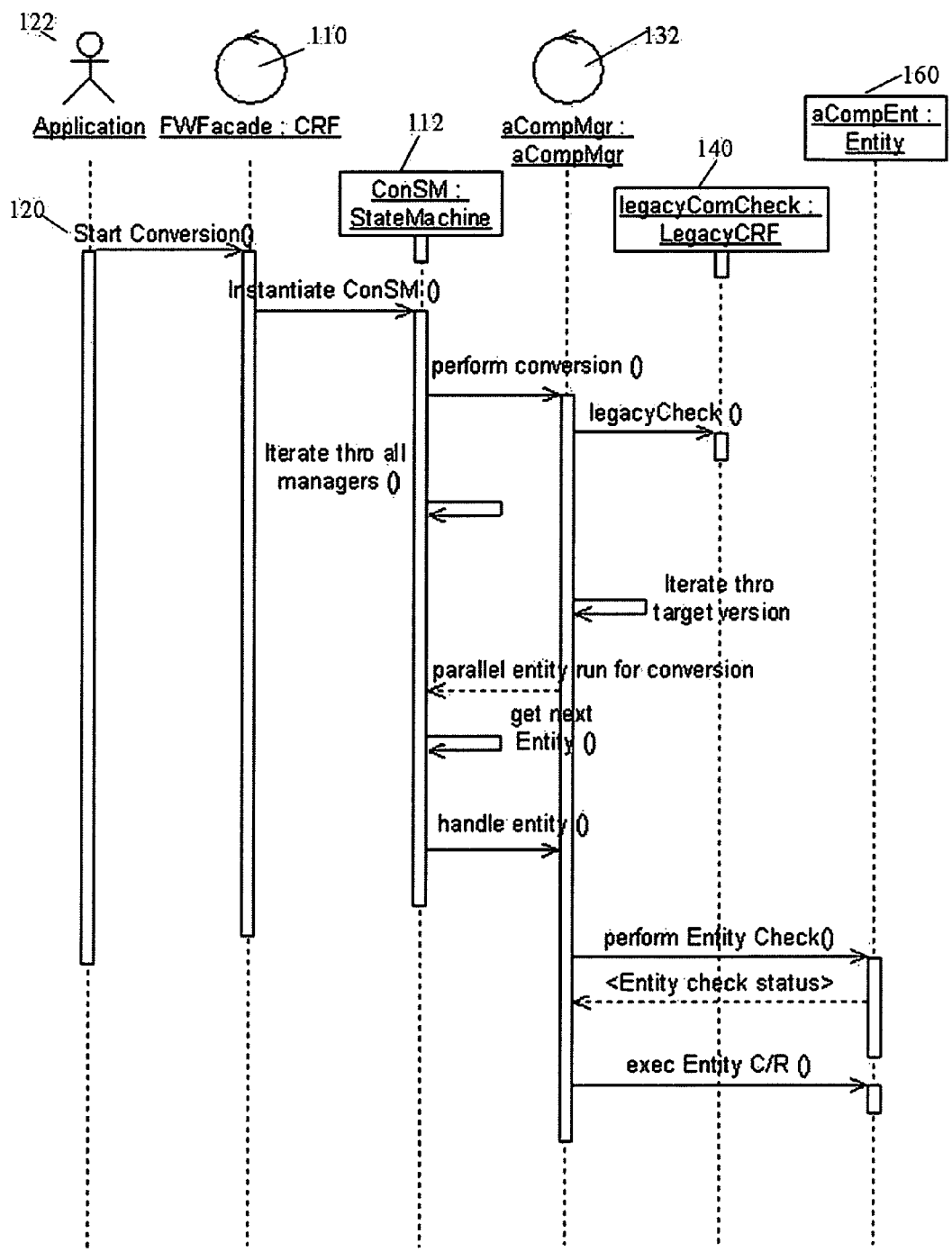
FIG. 2 shows the control flow of the present invention with point in time representation of the control flow of the framework.

Turning now to the second drawing, FIG. 2 is a dynamic portrayal showing the start conversion according to the present invention. It should be understood that the reversion would be the same, but with a reversal of the iteration order. At the top of the drawing is shown a stick figure 122 representing an application. The application starts the conversion process on the framework façade 110. The command may be carried out in the form of key strokes, or may be started from a program received by email or the internet, or from a floppy disc or CD run on a machine, such as a computer or a PC, or by any of the other methods well known in the art.

The narrow vertical boxes represent steps to be taken. They show time sequences, but are not necessarily time lines. From left to right in the diagram, they represent the sequential steps that are taken to carry out the conversion, and the comparative length of each step. The framework façade 110 instantiates the state machine 112. The application starts the conversion/reversion/restart operation on the Framework Façade. (For the remaining steps, we will assume the 'conversion' step, although 'reversion' would be the same, but the iteration order would be reversed.) The state machine iterates through the component managers 132 and starts the conversion operation for each component manager.

Each component manager performs any legacy checks (see box 140) and conversion operations. It is instructed to iterate through all entities (box 160) it manages. If parallel conversion is possible for the manager, additional entities may be simultaneously handled. For each entity, the manager is instructed to perform a check on the entity to determine if conversion is required. If conversion is required, then the component manager is instructed to iterate through its set of versions. For each version, it performs conversion checks for the entity. If the conversion is successful, the component manager is instructed to iterate through its set of versions again. For each version, the component manager performs the conversion operation on the entity, and the entity is persisted with the current version information.

When the iterations are completed, the following actions are taken:

Version iteration: Entity will be converted into the current version, and another entity would be processed;

Entity iteration: Then all entities for the component manager will be processed.

Component iteration: All Entities for all Component Managers have been converted. The system is ready for operation.

The system of the present invention utilizes the following design factors listed as desirable (should) or vital (shall).

[should] abstract framework definition uses a non-deterministic finite automaton: The CRF uses this design pattern to enable components to be plugged in at appropriate state transitions.

[should] decouple semantics and enable Document Driven Programming: Implementation uses a meta-descriptor language, such as XML, to handle semantics and definition.

[shall] bridge legacy CRF with the new CRF: The new CRF is built over (wrap) the existing (legacy) CRF with minor re-factoring to the legacy code to enable the two passes of the framework.

[shall] lists all incompatibilities prior to execution: The CRF has two passes, the first one being validation wherein a complete listing of all the incompatibilities are detected and listed for the customer to take action before executing C/R and the second being execution.

[shall] re-startability: This is a critical requirement that is regarded as a safety measure. Every successful component transaction is logged in the event of catastrophic failure and, on C/R retry, the server picks up from the last committed point.

[should] support C/R between fixpacks: The CRF allows developers to plug in C/R specific behavior for a specific fixpack in addition to major/minor server versions.

[shall] component versioning: Every component manager of the CRF is responsible for managing specific component versions to ensure server integrity during C/R.

[shall] refactor existing CRF: The legacy CRF is refactored to support the two passes (validation & execution) in line with the new CRF design.

[should] platform C/R support: The CRF allows developers to plug in platform specific behavior within the same server version, e.g. 32 <>64 bit C/R.

[should] reduce testing effort: The CRF is a single-server-version-step iterator. Testing only occurs for the current version and its predecessor.

[shall] verbose output: The CRF and its component managers have the responsibility to provide and log all information that is critical for failure analysis.

[shall] source code infrastructure: Directories support better organization that is clean and simple to use with intuitive/repeating directory structures and files within components.

[should] component behavior decoupling: The component is responsible for all its transitions including interaction with legacy CRF, transactions, logging data, etc.

[should] performance: Components iterate through all their instances (sub components) by effectively parallelizing thread execution—as much as possible.

[should] performance: The CRF should minimize server footprint, and support on-demand loading, while attempting to remain within the boundaries of existing server infrastructure.

[shall] testing re-startability: The CRF supports an undocumented environment variable signaling to the framework that it is in test mode and needs to bail out at the specified crash point. Upon restart, the framework picks up from that crash-point.

Starting Conversion, Reversion or Restart—The CRF supports re-startability upon crash while performing C/R.

The CRF of the present invention addresses idiosyncrasies of the prior art CRFs. These include maintainability of C/R code and semantics, and developers having to keep track of changes for all previously supported server permutations just to advance to the next server release. This leads to testing being very exhaustive as well, the server rendered unstable, the inability to restart on server crash during C/R, etc. Owing to the fragile nature of the earlier CRFs, the CRF of the present invention is robust and addresses all the pain points and stability of the new CRF.

Partial Conversion/Reversion

Restartable conversion/reversion is a feature of this new CRF. The server is restartable if conversion/reversion fails for some reason.—but this is not true of the prior art CRFs. The completed transactions cannot be rolled back in situations which involve multiple transactions in a conversion or reversion. So, there has to be another mechanism/framework in place to handle such scenarios.

Partial C/Rs can be particularly troublesome if their C/R data is not logged. The following cases show when a partial conversion might occur; in other words, when there is a crash during the conversion/reversion, thereby necessitating the C/R to be restarted.

Cases:
conv_1. Has a structure been converted/reverted to the target format?
conv_2. Has a structure been converted/reverted?
conv_3. Do all operations on the structures being converted/reverted need to be redone—even if they have already been converted/reverted?
conv_4. Do operations on the structures being converted/reverted need to be repeated, if they were already converted/reverted?

It is important when performing conversion/reversion to be aware of these cases and to categorize each step in their conversion process. If there are both conv_2 and conv_4 and no logging, then it is difficult to restart the conversion. If conv_4 is true and no logging, then it should be determined that conv_2 is not true. Some way of tagging the structure should be used to know whether or not conversion/reversion was run on it. This is easier to do for conversion since a tag field can be added if necessary. For reversion, tag fields cannot be added.

Some layers may pick up the logging for free from disk management, so separate logging is not an issue for that layer. However, transaction boundaries during C/R can still be a concern.

If both conv_2 and conv_4 are true, then it is important to log or else the C/R would not be restartable. When the "first" attempt at conversion is made, the logs must be empty—that is, nothing to redo/undo. Disk management layers checks this.

Crashes can be very troublesome for the support organization. The analysis of crashes is made much easier using the present invention. Upon crashing, the system should print out the values of the structures being converted and the step and conversion operation being performed. These can be stored in fixed locations and dumped in HEX.

Crashes are caused factors such as: (1) The conversion/reversion code itself due to an error in the code or an error in the input data. By merely rerunning the conversion/reversion, another crash is most likely. (2) Some other event which simply crashed the server. (3) Error in input data (corrupted storage).

Transactions

For restartable conversion/reversion, most people are using transactions to enforce this. Formalization of this concept is necessary to avoid programmers making mistakes.

Transactions have the problem that they might "go long". That is, the transaction is so long it overflows the available log files. Long transactions are rolled back by the system automatically. When converting a long table, for example, whose length is arbitrary, it is difficult to be sure that log space is not exceeded. One possibility is to convert n number of rows and then perform a 'commit' work on this subunit of work. The critical point is that there must be some way of knowing at what point the conversion is interrupted, unless it is not important to remember this. If a crash occurs, it can be important to know where to start conversion again.

To remember where the last transaction occurred, the stopping point must be logged in the same transaction. When writing to some other location on disk, for example, it is difficult to restart the server reliably—even if the write is performed within the same transaction.

In some cases, there might be other ways to remember where the transaction left off, or other cases where it might not be important to know where the stopping point is. If copying a table contents to another table and then renaming that table to the original name, it might be easy to detect that the operation was not finished, and can simply be restarted.

The approach guidance for the iterative single-step C/R framework is based on the fundamental principle that it will be built on top of the existing CRF (with minimum re-factoring). The framework consists of three non-deterministic state machines (Convert (C), Revert (R) and Restart (Re)) which encapsulate appropriate logic. There are also component managers that interface with the framework and have component responsibility of validation and execution. Upon receiving a C/R/Re request, the framework will then instantiate and initialize the appropriate state machines. Each of the state machines will have a finite set of states and transitions based on its interaction with the component manager, server and handling exception scenarios.

The conversion/reversion framework has the responsibility to ensure the integrity of the state machines and log appropriately. The component managers manage all the activities within the component. Mandated component activities include, but are not restricted to:

Provide flexibility at the component level by retaining the existing CRF and building on top of it. This calls for the legacy implementation to be refactored to allow it to be decoupled and reused at an appropriate level.

Interact with CRF for propagating exceptions, errors, logging, control flow, resource management, etc.

Orchestrate component validation prior to C/R by acting as the liaison between the legacy CRF and component validation routines of its component entities.

Orchestrate component execution after successful validation by acting as the liaison between the legacy CRF and the entities it manages.

Control the execution and data flow between all the entities it manages.

Component version branding scheme. May be unique to each manager.

Iterate through all component versions for all its managed entities.

Transaction management within component.

Help parallelize, if possible, the execution across its managed entities.

The framework also supports restarts in the event of server crashes during C/R. This is supported by the restart state machine whose primary responsibility is to analyze the restart situation, scan the logs and work with component managers to determine the last 'known' committed state. The component branding helps determine the start point. The extensible log manager used by smart blobs should be used to aid the framework in this effort.

Each entity is represented by a component manager whose responsibilities are also listed. In order to interface with the framework, here are the basic typedefs which are the basis for binding the conversion/reversion framework to the components. These typedefs allow the framework to implement the generalized conversion/reversion logic, but call the component specific code.

All Callbacks will return a status to inform the framework of the results of the callback.

```
typedef enum CVR_Retstatus = {
CVR_OK,        /* No Errors, No reason not to continue. */
CVR_Warning,   /* No Errors, Prompt for continue/abort. */
CVR_CheckFail  /* FailCheck, but should continue checking. */
```

-continued

```
CVR_Fail,      /* Error, or reason to not continue. */
CVR_Halt       /* Must halt all conversion/reversion immediately. */
) CVR RetStatus;
```

The strategy that is used for 32←→64 bit platform C/R and to handle situations where it is impossible to avoid putting in features in patch releases that have C/R impact is explained by the following example:

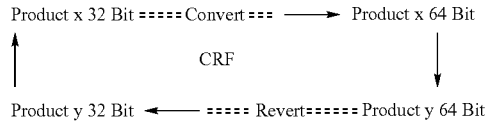

This depicts, first proceed with convert/revert to the target platform architecture version and then proceed with the C/R of the target server version.

Listed below are principles and mandates that govern the high level design architecture of the present invention.

1. The system shall sequence the ordering of the agents so that lower layers complete before upper layers during conversion, and the upper layers complete before the lower layers for reversion. The rationale for this is that there is a dependency between the C/R components; for example, dependent entity x cannot generally perform conversion before independent entity y is complete because the lower level records cannot be read.

2. The system should be able to invoke multiple instances of component entities that can perform C/R in parallel. The entities will have to know what they are doing and what the other threads are doing so they do not redo the same work or miss work items. This is left to the individual component manager implementations, and is not part of the framework of the present invention.

3. The system should be able to "dynamically" register new conversion/reversion entities such as with an extensible log manager.

4. There should be a central point from which it can be determined what operations are required and what operations are currently in progress, for debugging purposes. An extensible log manager may be used for all debugging related operations 5. Each component entity before performing a C/R operation should record the operation in a standard location (record_event) that will be dumped upon a crash. The operation records the type of operation being performed and also the exact location. This procedure is used for debugging purposes only, and not for restart following an interrupt.

6. Each component entity before performing a C/R operation should record the "pre-image" structures being modified in a standard "record-event" location where it can be dumped upon crash.

7. Each component entity before performing a C/R operation should record whether or not the operation is restartable in the "record_event" area, that is, whether or not the C/R could be restarted upon crash.

8. When the component manager goes to the next step, the last successfully completed step should be logged and the log flushed.

9. When the component manager goes to the next step, the last information written to the record_event location shall be cleared.

10. Component entities shall be able to return a "checkpoint" flag. Upon seeing the checkpoint flag set, the component manager then performs a checkpoint.
11. The component manager provides its entities with a "restart" flag which indicates whether or not this conversion or reversion has been restarted.
12. When a component entity is converting itself, it shall tag itself as "CONVERSION ACTIVE".
13. When a component entity is reverting itself, it shall tag itself as "REVERSION ACTIVE".
14. For restartable C/R and uniformity, component entities shall provide standard routines to determine the version of a structure by examining it.
15. After a 'component entity' finishes converting/reverting, that component entity shall tag itself with the new version number. It should be noted that in data management layer, a 'component entity' might be a chunk.
16. The component manager shall query each subsystem before C/R is attempted to see whether or not the C/R can be successful. The framework will insure that all such queries are issued before attempting the actual C/R.
17. A component entity version number shall be represented in the framework as a sequential 16 bit number, indicating the version for the entity and verifying that there is a version number for each registered entity.
18. All component entities shall identify with a level number. A level number describes the order of execution for that entity. The following numbering scheme is suggested. Since there is a space of 100 between numbers, new dependencies can easily be inserted.

| 0 | no dependencies |
|---|---|
| 100 | Component 1 |
| 200 | Component 2 |
| 300 | ... |
| {ordered list} | Component n |

If version numbers match, then the entities are suitable candidates to run in parallel.
19. (Should for design principle #2) When the component manager is queried for the versions, the manager should return the maximum number of threads which can be run. When the component manager starts an entity thread, it supplies a number between 1 and n indicating which thread this is. That is, the first thread is 1; the second is 2, and so on.
20. (Should for design principles #5 and #6) The component entity will use the thread number to determine the location to dump the operation and pre-image.
21. To enable re-startability, all component managers, if applicable, should begin a transaction, perform the CRF operation for an entity, register entity completion, commit the transaction and return to the CRF for the next entity.
22. The framework then will perform CHECKPOINT as it iterates through component managers
23. The framework will support an undocumented environment variable to enable testing efforts to stop the server at pre-determined states and test the robustness of the framework with respect to restartability, e.g. environment variable and its assignment are as follows: PRODUCTx_CRFCRASHPOINT=ComponentMgr Name:EntityNumber:Server Version.

It should be understood that the present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or a computer program in the present context means any expression, in any language, code (i.e., picocode instructions) or notation, of a set of instructions intended to cause a system having an information processing capability to perform a particular function either directly or after either or both of the following occur: (a) conversion to another language, code or notation; (b) reproduction in a different material form.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A method for converting logical data entities in a system, comprising:
   providing an apparatus that arranges a plurality of logical entities into a priority of dependencies wherein a dependent upper-layer entity of the plurality of logical entities is dependent upon an independent lower-layer entity of the plurality of logical entities;
   upon receipt of a conversion or reversion request, converting the independent lower-layer entity and the dependent upper-layer entity by:
      instantiating a conversion framework state machine for interacting with a component manager and updating completely the independent lower-layer entity from an earlier independent lower-layer entity version to a latest independent lower-layer entity version by iterating through a set of earlier versions of the independent lower-layer entity before proceeding with an updating of the dependent upper-layer entity from an earlier dependent upper-layer entity version to a latest dependent upper-layer entity version; and
      instantiating a reversion framework state machine for interacting with a component manager and reverting completely the dependent upper-layer entity from the latest dependent upper-layer entity version to the earlier dependent upper-layer version by iterating through a set of later versions of the dependent upper-layer entity before proceeding with a reverting of the independent lower-layer entity from the latest independent lower-layer entity version to the earlier independent lower-layer entity version; and
   wherein the updating and the reverting each comprise iteratively checking each of the plurality of logical entities to determine if a conversion or a reversion is required and valid and responsively updating or reverting the each iteratively checked logical entities if the conversion or the reversion is required.

2. The method of claim 1, further comprising:
   persisting each of the updated and the reverted entities with current version information.

3. The method of claim 2, further comprising:
logging a last-committed point for a successful conversion or a successful reversion of a version of a one of the plurality of logical entities;
interrupting an updating or a reverting of the one logical entity;
restarting the interrupted updating or the interrupted reverting of the one logical entity at the logged last-committed point on a conversion retry or a reversion retry.

4. The method of claim 3, further comprising:
upon crashing, printing out values of a logical entity being updated or reverted and a step and an operation being performed; and
storing the printed out values in a fixed location.

5. The method of claim 4, further comprising:
supporting an undocumented environment variable test mode signaling;
bailing out from the interrupted updating or the interrupted reverting of the one logical entity at a specified crash point in response to the undocumented environment variable test mode signaling; and
picking up from the specified crash point upon restarting of the interrupted updating or the interrupted reverting of the one logical entity.

6. The method of claim 5, further comprising:
determining if a parallel conversion or a parallel reversion can be made simultaneously on multiple entities of the plurality of logical entities; and
simultaneously handling converting or reverting of the multiple entities if determined that parallel conversions can be made.

7. An apparatus, comprising:
a processor having executed thereon:
a conversion/reversion framework that instantiates a state machine to convert a plurality of logical data by:
arranging the plurality of logical entities into a priority of dependencies wherein a dependent upper-layer entity of the plurality of logical entities is dependent upon an independent lower-layer entity of the plurality of logical entities; and
upon receipt of a conversion or reversion request, converting the independent lower-layer entity and the dependent upper-layer entity by:
instantiating a conversion framework state machine for interacting with a component manager and updating completely the independent lower-layer entity from an earlier independent lower-layer entity version to a latest independent lower-layer entity version by iterating through a set of earlier versions of the independent lower-layer entity before proceeding with an updating of the dependent upper-layer entity from an earlier dependent upper-layer entity version to a latest dependent upper-layer entity version; and
instantiating a reversion framework state machine for interacting with a component manager and reverting completely the dependent upper-layer entity from the latest dependent upper-layer entity version to the earlier dependent upper-layer version by iterating through a set of later versions of the dependent upper-layer entity before proceeding with a reverting of the independent lower-layer entity from the latest independent lower-layer entity version to the earlier independent lower-layer entity version; and
wherein the updating and the reverting each comprise iteratively checking each of the plurality of logical entities to determine if a conversion or a reversion is required and valid and responsively updating or reverting the each iteratively checked logical entities if the conversion or the reversion is required.

8. The apparatus of claim 7, wherein the conversion and reversion framework state machines further persist each of the updated and the reverted entities with current version information.

9. The apparatus of claim 8, wherein the conversion and reversion framework state machines further:
log a last-committed point for a successful conversion or a successful reversion of a version of a one of the plurality of logical entities; and
restart an interrupted updating or an interrupted reverting of the one logical entity at the logged last-committed point on a conversion retry or a reversion retry.

10. The apparatus of claim 9, wherein the conversion and reversion framework state machines further:
print out values of a logical entity being updated or reverted and a step and an operation being performed upon crashing; and
store the printed out values in a fixed location.

11. The apparatus of claim 10, wherein the conversion and reversion framework state machines further:
support an undocumented environment variable test mode signaling;
bail out from the interrupted updating or the interrupted reverting of the one logical entity at a specified crash point in response to a signaling of the undocumented environment variable test mode; and
pick up from the specified crash point upon a restart of the interrupted updating or the interrupted reverting of the one logical entity.

12. The apparatus of claim 11, wherein the conversion and reversion framework state machines further:
determine if a parallel conversion or a parallel reversion can be made simultaneously on multiple entities of the plurality of logical entities; and
simultaneously handles a converting or a reverting of the multiple entities if determined that parallel conversions can be made.

13. A computer program product for converting data entities, the computer program product comprising:
a non-transitory computer readable storage medium having computer readable program code embodied therewith, the computer readable program code configured to:
arrange a plurality of logical entities into a priority of dependencies wherein a dependent upper-layer entity of the plurality of logical entities is dependent upon an independent lower-layer entity of the plurality of logical entities;
upon receipt of a conversion or reversion request, convert the independent lower-layer entity and the dependent upper-layer entity by:
instantiating a conversion framework state machine for interacting with a component manager and updating completely the independent lower-layer entity from an earlier independent lower-layer entity version to a latest independent lower-layer entity version by iterating through a set of earlier versions of the independent lower-layer entity before proceeding with an updating of the dependent upper-layer entity from an earlier dependent upper-layer entity version to a latest dependent upper-layer entity version; and instantiating a reversion framework state machine for interacting with a component manager and reverting completely the dependent upper-layer entity from the latest dependent upper-layer entity version to the earlier dependent upper-layer version by iterating through a set of later versions of the dependent upper-layer entity before proceeding with a reverting of the independent lower-layer entity from the latest independent lower-layer entity version to the earlier independent lower-layer entity version; and wherein the updating and the reverting each comprise iteratively checking each of the plurality of logical entities to determine if a conversion or a reversion is required and valid and responsively updating or reverting the each iteratively checked logical entities if the conversion or the reversion is required.

14. The computer program product of claim 13, the computer readable program code configured to further persist each of the updated and the reverted entities with current version information.

15. The computer program product of claim 14, the computer readable program code further configured to:
log a last-committed point for a successful conversion or a successful reversion of a version of a one of the plurality of logical entities; and
restart an interrupted updating or an interrupted reverting of the one logical entity at the logged last-committed point on a conversion retry or a reversion retry.

16. The computer program product of claim 15, the computer readable program code further configured to:
print out values of a logical entity being updated or reverted and a step and an operation being performed upon crashing; and
store the printed out values in a fixed location.

17. The computer program product of claim 16, the computer readable program code further configured to:
support an undocumented environment variable test mode signaling;
bail out from the interrupted updating or the interrupted reverting of the one logical entity at a specified crash point in response to a signaling of the undocumented environment variable test mode; and
pick up from the specified crash point upon a restart of the interrupted updating or the interrupted reverting of the one logical entity.

18. The computer program product of claim 17, the computer readable program code further configured to:
determine if a parallel conversion or a parallel reversion can be made simultaneously on multiple entities of the plurality of logical entities; and
simultaneously handle a converting or a reverting of the multiple entities if determined that parallel conversions can be made.

19. A method for deploying an application for facilitating the conversion and reversion of a plurality of logical data entities, comprising:
providing a computer infrastructure to convert a plurality of logical data entities by:
arranging the plurality of logical entities into a priority of dependencies wherein a dependent upper-layer entity of the plurality of logical entities is dependent upon an independent lower-layer entity of the plurality of logical entities; and
upon receipt of a conversion or reversion request, converting the independent lower-layer entity and the dependent upper-layer entity by:

instantiating a conversion framework state machine for interacting with a component manager and updating completely the independent lower-layer entity from an earlier independent lower-layer entity version to a latest independent lower-layer entity version by iterating through a set of earlier versions of the independent lower-layer entity before proceeding with an updating of the dependent upper-layer entity from an earlier dependent upper-layer entity version to a latest dependent upper-layer entity version; and instantiating a reversion framework state machine for interacting with a component manager and reverting completely the dependent upper-layer entity from the latest dependent upper-layer entity version to the earlier dependent upper-layer version by iterating through a set of later versions of the dependent upper-layer entity before proceeding with a reverting of the independent lower-layer entity from the latest independent lower-layer entity version to the earlier independent lower-layer entity version; and wherein the updating and the reverting each comprise iteratively checking each of the plurality of logical entities to determine if a conversion or a reversion is required and valid and responsively updating or reverting the each iteratively checked logical entities if the conversion or the reversion is required.

20. The method for deploying of claim 19, wherein the conversion/reversion framework state machine further persists each of the updated and the reverted entities with current version information.

21. The method for deploying of claim 20, wherein the conversion/reversion framework state machine further:
logs a last-committed point for a successful conversion or a successful reversion of a version of a one of the plurality of logical entities; and
restarts an interrupted updating or an interrupted reverting of the one logical entity at the logged last-committed point on a conversion retry or a reversion retry.

22. The method for deploying of claim 21, wherein the conversion/reversion framework state machine further:
prints out values of a logical entity being updated or reverted and a step and an operation being performed upon crashing; and
stores the printed out values in a fixed location.

23. The method for deploying of claim 22, wherein the conversion/reversion framework state machine further:
supports an undocumented environment variable test mode signaling;
bails out from the interrupted updating or the interrupted reverting of the one logical entity at a specified crash point in response to a signaling of the undocumented environment variable test mode; and
picks up from the specified crash point upon a restart of the interrupted updating or the interrupted reverting of the one logical entity.

24. The method for deploying of claim 23, wherein the conversion/reversion framework state machine further:
determines if a parallel conversion or a parallel reversion can be made simultaneously on multiple entities of the plurality of logical entities; and
simultaneously handles a converting or a reverting of the multiple entities if determined that parallel conversions can be made.

\* \* \* \* \*